United States Patent
Gross et al.

(10) Patent No.: US 9,108,554 B2
(45) Date of Patent: Aug. 18, 2015

(54) STRUCTURAL ELEMENT FOR A VEHICLE SEAT

(75) Inventors: Bernd Gross, Langenfeld (DE); Andreas Dannheisig, Sassenberg (DE); Philipp Ehrenstein, Cologne (DE); Marian Stepankowsky, Stuttgart (DE)

(73) Assignee: Johnson Controls Technology Company, Holland, MI (US)

( * ) Notice: Subject to any disclaimer, the term of this patent is extended or adjusted under 35 U.S.C. 154(b) by 1112 days.

(21) Appl. No.: 12/447,250

(22) PCT Filed: Oct. 29, 2007

(86) PCT No.: PCT/EP2007/009368
§ 371 (c)(1), (2), (4) Date: Dec. 21, 2009

(87) PCT Pub. No.: WO2008/049639
PCT Pub. Date: May 2, 2008

(65) Prior Publication Data
US 2010/0171356 A1    Jul. 8, 2010

(30) Foreign Application Priority Data

Oct. 27, 2006 (DE) .......................... 10 2006 051 377
Apr. 4, 2007 (DE) .......................... 10 2007 016 690

(51) Int. Cl.
B60N 2/68 (2006.01)

(52) U.S. Cl.
CPC ........... B60N 2/682 (2013.01); *Y10T 29/49826* (2015.01)

(58) Field of Classification Search
CPC ....................................................... B60N 2/682

USPC ................ 297/452.18, 216.13, 216.14, 452.2
See application file for complete search history.

(56) References Cited

U.S. PATENT DOCUMENTS

| | | | |
|---|---|---|---|
| 4,530,541 A * | 7/1985 | Resag et al. | 297/452.18 |
| 5,240,310 A * | 8/1993 | Rink | 297/452.18 |
| 5,685,615 A | 11/1997 | Bechem et al. | |
| 6,227,595 B1 * | 5/2001 | Hamelin et al. | 296/65.03 |
| 6,352,311 B1 | 3/2002 | Hayotte | |
| 6,375,267 B1 * | 4/2002 | Ishikawa | 297/452.18 |
| 6,572,196 B1 * | 6/2003 | Thieme et al. | 297/452.18 |

(Continued)

FOREIGN PATENT DOCUMENTS

| | | |
|---|---|---|
| DE | 8704426 U1 | 5/1987 |
| DE | 4442586 A1 | 6/1996 |

(Continued)

OTHER PUBLICATIONS

International Search Report for application No. PCT/EP2007/009368 mailed Feb. 13, 2008.

(Continued)

*Primary Examiner* — David R Dunn
*Assistant Examiner* — Tania Abraham
(74) *Attorney, Agent, or Firm* — Fletcher Yoder, P.C.

(57) ABSTRACT

A motor vehicle seat has a structural element that includes a plurality of components, at least some of which are connected to one another. At least one of the components is available in a plurality of materials, such as steel or a lightweight construction. The shape of the components, however, is configured so that it remains unchanged irrespective of the component material.

15 Claims, 6 Drawing Sheets

(56) References Cited

U.S. PATENT DOCUMENTS

| | | | |
|---|---|---|---|
| 6,761,412 B1 * | 7/2004 | Garnweidner et al. | 297/452.18 |
| 6,869,145 B2 * | 3/2005 | Matsunuma | 297/452.18 |
| 6,896,324 B1 * | 5/2005 | Kull et al. | 297/216.1 |
| 6,986,549 B2 * | 1/2006 | Kniese | 297/284.1 |
| 7,066,552 B2 * | 6/2006 | Yoshida | 297/452.18 |
| 7,083,230 B2 * | 8/2006 | Kull et al. | 297/216.1 |
| 2004/0113481 A1 | 6/2004 | Saberan et al. | |
| 2005/0082896 A1 * | 4/2005 | Gupta et al. | 297/452.65 |
| 2005/0225133 A1 * | 10/2005 | Aufrere et al. | 297/216.1 |
| 2005/0269846 A1 | 12/2005 | Vits et al. | |

FOREIGN PATENT DOCUMENTS

| | | |
|---|---|---|
| DE | 4442588 | 6/1996 |
| DE | 19501743 | 7/1996 |
| DE | 19501743 A1 | 7/1996 |
| DE | 19826732 | 1/2000 |
| DE | 19826732 A1 | 1/2000 |
| DE | 69702023 T2 | 1/2001 |
| DE | 10 2004 039 366 A1 | 3/2006 |
| DE | 102004039366 | 3/2006 |
| DE | 102004044734 | 3/2006 |
| DE | 102004044734 A1 | 3/2006 |
| DE | 20 2006 001 868 U1 | 4/2006 |
| DE | 202006001868 | 4/2006 |
| EP | 0 372 338 A2 | 6/1990 |
| EP | 0372338 | 6/1996 |
| EP | 0736273 | 10/1996 |
| EP | 0736273 A1 | 10/1996 |
| EP | 0 749 867 A1 | 12/1996 |
| EP | 1180410 A2 * | 2/2002 |
| FR | 2 824 800 A1 | 11/2002 |
| GB | 1572695 | 7/1980 |
| JP | 2195907 A | 8/1990 |
| JP | 199323231 A | 2/1993 |
| JP | 199661329 A | 3/1996 |
| JP | 2000166691 | 6/2000 |
| JP | 2000166691 A | 6/2000 |
| JP | 2003102584 | 4/2003 |
| JP | 2008520356 | 6/2008 |
| WO | 2006055616 | 5/2006 |

OTHER PUBLICATIONS

Written Opinion for application No. PCT/EP2007/009368 mailed Feb. 13, 2008.

* cited by examiner

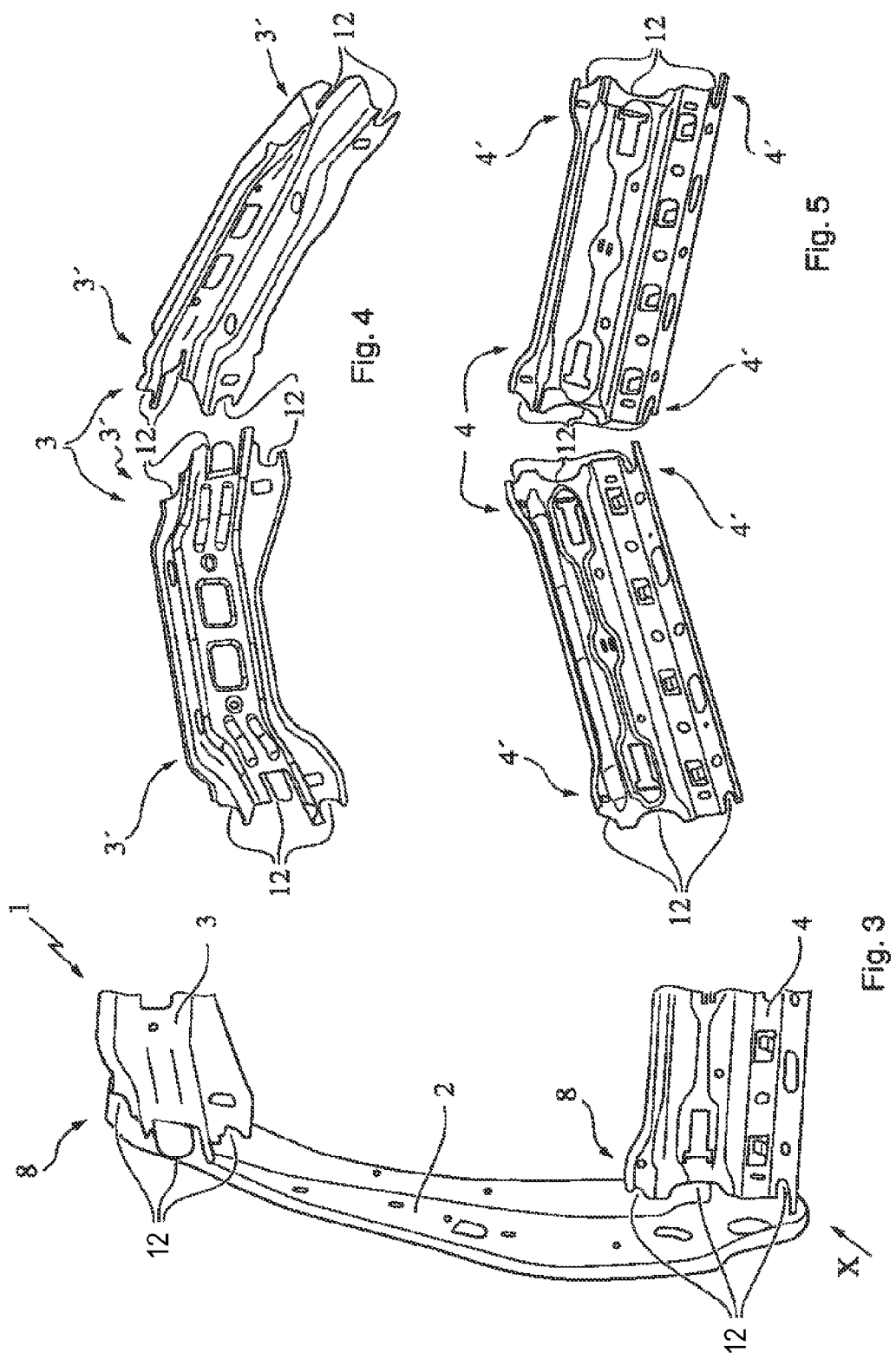

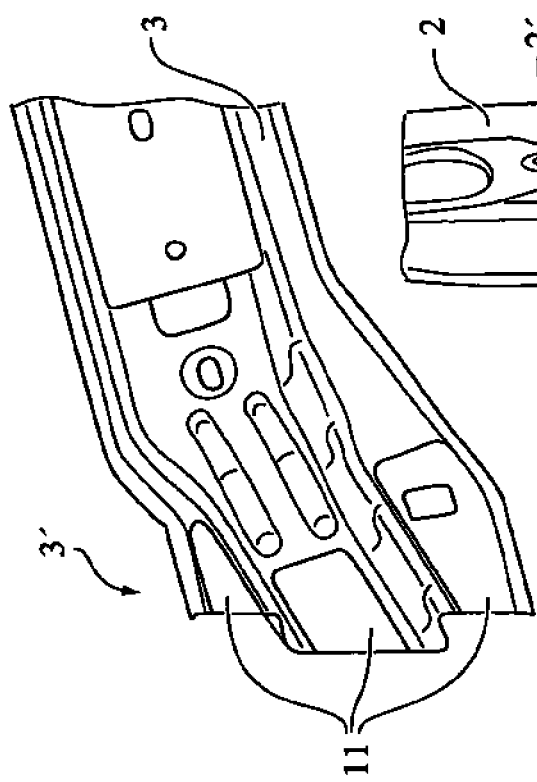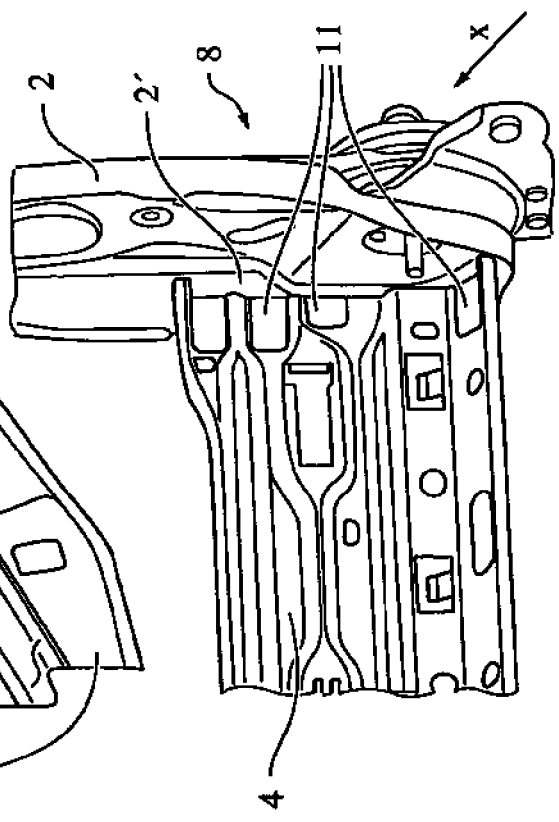

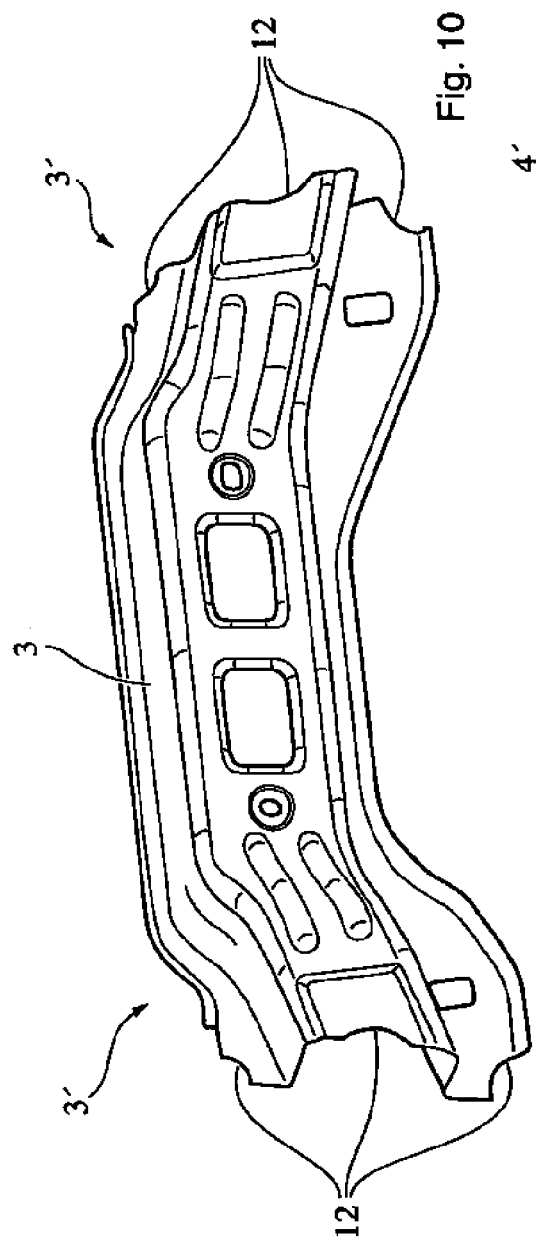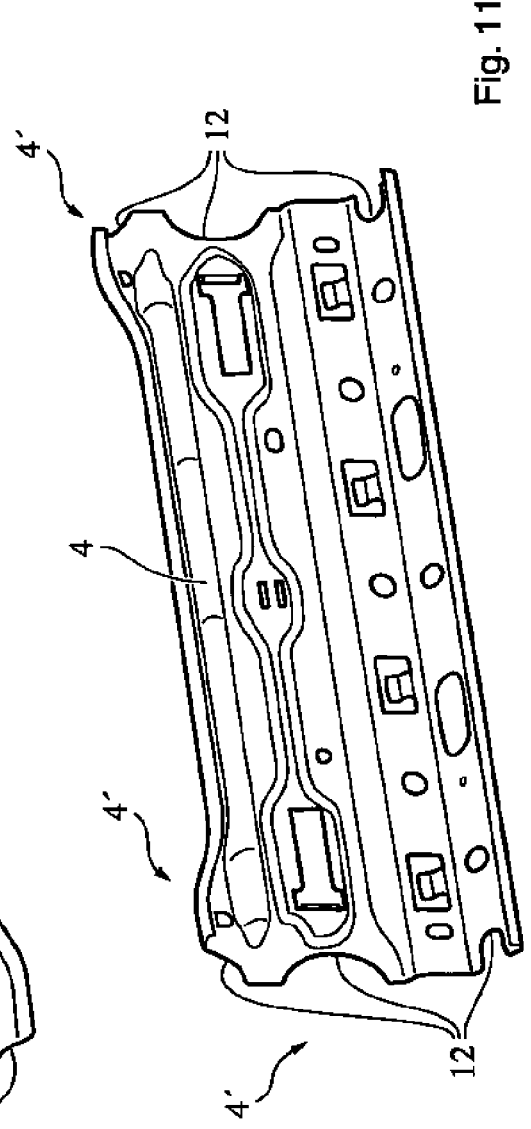

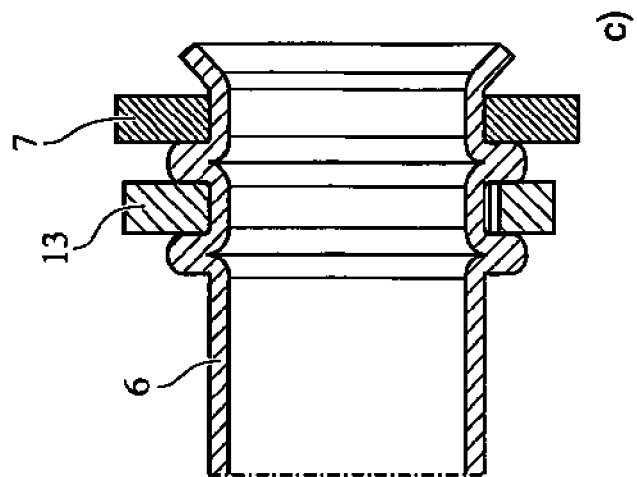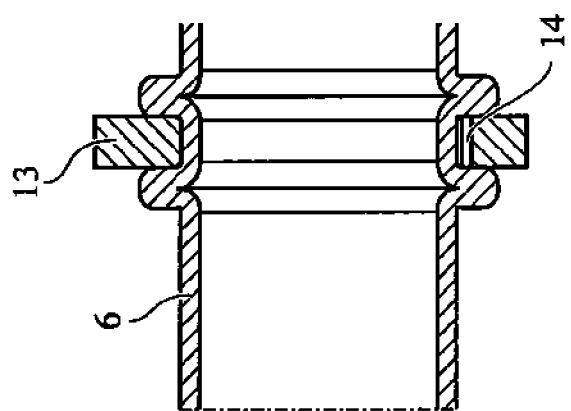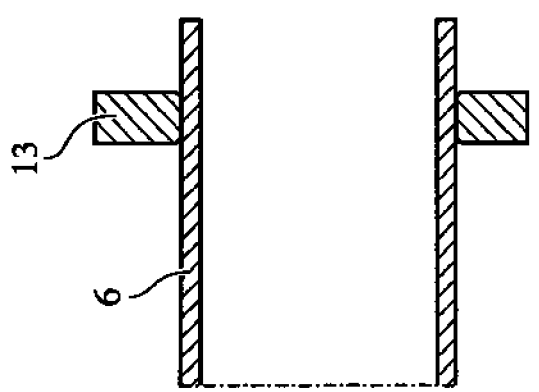
Fig. 12

STRUCTURAL ELEMENT FOR A VEHICLE SEAT

CROSS REFERENCE TO RELATED APPLICATIONS

This application claims priority from and the benefit of PCT Application No. PCT/EP2007/009368, filed on Oct. 29, 2007; German Patent No. DE 10 2006 051 377.0, filed on Oct. 27, 2006; and German Patent DE 10 2007 016 690.9, filed on Apr. 4, 2007; all entitled "Structural Element for a Vehicle Seat", which are herein incorporated by reference.

BACKGROUND

The invention relates to a vehicle seat, in particular a motor vehicle seat with a structural element which in each case comprises a plurality of components, at least some of which are connected to one another. Furthermore, the present invention relates to a method for producing the motor vehicle seat according to the invention.

The motor vehicle seats according to the invention are known from the prior art. The majority of all of the motor vehicle seats currently mass produced have structural elements which a structure using a very wide variety of steel profiles and sheets. However, motor vehicle seats with structural elements in a lightweight construction, said structural elements being composed of different materials, are also known. Structural elements of this type are disclosed, for example, in DE 10 2004 044 734, DE 697 02 023 T2 and DE 198 26 732 A1. However, said structural elements are currently manufactured differently and in a lower piece number than structural elements made of steel and, as a result, are more expensive to produce.

It was therefore the object of the present invention to make available a motor vehicle seat which can be made available cost-effectively even in a lightweight construction.

The object is achieved by a motor vehicle seat with a structural element which in each case comprises a plurality of components, at least some of which are connected to one another, wherein at least one component is available in a plurality of embodiments, and the shape of a component which is connected thereto is configured in such a manner that it remains unchanged irrespective of the embodiment of the components.

SUMMARY

The present invention relates to a motor vehicle seat which can be located in any row in the particular motor vehicle. It may accordingly be a front seat or a rear seat. The motor vehicle seat according to the invention may provide a seat for one or more individuals. The motor vehicle seat according to the invention may accordingly also be a seat bench.

According to the invention, the motor vehicle seat has a structural element which is composed of a plurality of components, at least some of which are connected to one another. At least one of said components is available in a plurality of embodiments, for example in a conventional steel construction or in a lightweight construction. However, said component may also be designed differently for different types of connection. For example, this component may have a somewhat different configuration depending on whether it is adhesively bonded or welded to the other component.

According to the invention, it is now provided that, for example in a steel construction, certain components may be replaced by components in a lightweight construction without the joining components having to be changed. As an alternative or in addition, it can be provided, for example, that one component is configured differently, depending on the type of connection to the other component. As a result, it is possible to realize various embodiments with one and the same structure design on a vehicle platform. Therefore, both a "low cost variant" consisting of steel and a "high end variant" consisting of a hybrid construction can be made available. In addition, different connecting variants may be used. In the case of the hybrid variant, steel components are preferably used with components which are not manufactured from steel, for example a lightweight construction material, such as, for example, plastic, aluminum and/or an aluminum alloy or a combination thereof. The hybrid design here is always significantly lighter than the conventional steel solution. A further great advantage of the motor vehicle seat according to the invention is that, in order to produce the structures, use can be made of virtually the same production equipment in terms of welding robot/systems and apparatuses. As a result, the production costs and the capital costs associated therewith, in particular for the production of the motor vehicle seat in a hybrid construction, could also be significantly reduced.

The structural element is preferably a backrest frame which constitutes the basic structure for a backrest of a motor vehicle seat. As a rule, a recliner for adjusting the inclination of the backrest, the spring system of the motor vehicle seat, the head restraint and optionally airbags are arranged on the backrest frame. The backrest frame preferably has backrest side parts which are connected to one another by a lower cross piece and/or an upper cross piece. The backrest side parts are preferably three-dimensionally shaped components of any material, for example steel sheet, a lightweight construction material, such as aluminum or plastic, or a combination of said materials, and particularly preferably remain unchanged, irrespective of the embodiment of the cross pieces and/or of the connection of the cross piece to the side part of the backrest. The lower and/or upper cross piece(s) are/is particularly preferably realized in steel or in the form of a lightweight construction. In both cases, the cross pieces are preferably configured as profiles and/or molded parts. The lightweight construction embodiment is preferably an extrudable profile, particularly preferably a profile which has a lightweight construction material, preferably aluminum, or a molded part, in particular made of lightweight construction material, for example aluminum.

At least one cross piece and the backrest side parts are in each case preferably connected to one another in a connecting region. Said connection in the connecting region may be an interlocking, frictional and/or material-to-material bonding connection. The interlocking and/or frictional connection take/takes place, for example, by riveting, U welding, press-joining (Tox clinching) or flanging. The material-to-material bonding connection preferably takes place by welding, in particular laser welding, laser hybrid welding, laser bracing or adhesive bonding. The parts are particularly preferably connected to one another by cold metal transfer (CMT) welding.

In another preferred embodiment, the structural element is the substructure, the seat frame, of a vehicle seat. Said substructure is the basic structure for that part of the vehicle seat on which the vehicle occupant sits. The substructure preferably has two substructure side parts. Said substructure side parts are preferably three-dimensionally shaped components which are particularly preferably formed from steel sheet or from a lightweight construction material, such as aluminum and/or plastic. Said substructure side parts are preferably connected to each other by at least one component. Said component, for example a transverse tube, is preferably realized in steel or in the form of a lightweight construction. In a lightweight construction, the component is preferably at least partially composed of a lightweight construction, material, for example from aluminum.

The substructure side parts and the component are in each case connected to one another in a connecting region.

The connection in the connecting region is preferably an interlocking, frictional and/or material-to-material bonding connection. The frictional connection takes place, for example, by riveting, U welding, press-joining (Tox clinching), crimping or flanging. The material-to-material bonding connection preferably takes place by welding, in particular laser welding, laser hybrid welding, laser bracing or adhesive bonding. The parts are particularly preferably connected to one another by cold metal transfer (CMT) welding.

The connecting region preferably remains unchanged irrespective of the embodiment of the components to be connected and/or of the type of connection. In particular the connecting region which is arranged on the backrest side parts and/or on the substructure side parts particularly preferably remains unchanged. As a result, these can always be made of the same side parts, irrespective of whether the components which connect them are realized in steel or from a lightweight construction material, and/or irrespective of the type of connection. This results in considerable advantages in terms of stock keeping and production.

The cross pieces and/or the component in a lightweight construction preferably have/has a larger cross section than in the steel embodiment. The connecting region has to be taken into consideration during the design of the same. It has to be constructed in such a manner that there is sufficient space for the component with the largest cross section. For the connection of two parts which are both manufactured from steel or from a lightweight construction material, such as aluminum, if appropriate an adapter has to be provided in order to obtain a suitable connection. As an alternative, a steel part can be widened in the connecting region, for example, by hydroforming.

The backrest side part preferably has a connecting region. Said connecting region particularly preferably remains unchanged irrespective of the type of connection to the cross piece; i.e. the backrest part can be, for example, welded or adhesively bonded to the cross piece without the backrest part having to be changed.

The connecting region of the backrest part is particularly preferably dimensioned for an adhesive bonding connection. Since the connecting region for an adhesive bonding connection is somewhat larger than for a welding connection, a cross piece can be arranged in said connecting region by adhesive bonding and by welding without the backrest part having to be changed.

The cross piece preferably has a connecting region which differs in design depending on the type of connection. All of the cross pieces are particularly preferably initially manufactured in a manner suitable for an adhesive bonding connection. This reduces the stock keeping. If the cross piece is then to be connected to the side part by welding, the cross piece is reworked, in particular by machining or by punching. During the reworking operation, in particular the contact surface of the cross piece is reduced and the cross piece contour provided for a welding connection is increased.

In a particularly preferred embodiment, the cross pieces are designed in such a manner that they are suitable both for a welding connection and for an adhesive bonding connection to the side part such that they can remain unchanged irrespective of the method of connection. This preferred embodiment of the present invention results in particularly low storage costs. The connection region of the side parts particularly preferably also remains unchanged.

In a preferred embodiment of the present invention, the side part and the cross piece are connected to each other by adhesive bonding and an interlocking and/or frictional connection, in particular a press-joining. In this case, the interlocking and/or frictional connection serves in particular to fix the side part and the cross piece in relation to each other before, during and/or after the adhesive bonding. In particular, the side part and the cross piece are fixed in their position with respect to each other until the adhesive has hardened. The machine time, in particular, can be reduced as a result. After the adhesive has hardened, the interlocking and/or frictional connection increases the load-bearing capacity of the connection.

The present invention furthermore relates to a method for producing the structural element according to the invention of a motor vehicle seat, in which a plurality of components are connected to one another by the same technique, irrespective of the particular embodiment of the component.

With regard to the structural elements, the components and the different embodiments thereof, reference is made to the statements above. This disclosure applies equally to the methods according to the invention.

According to the invention, use is made of the same connecting techniques, irrespective of which embodiments are involved in the particular component. For example, material-to-material methods of connection which are suitable both for connecting steel to steel and also steel to lightweight construction material are selected. If appropriate, only the parameters of the method of connection are changed, for example, welding parameters, or the preparation of the connection is changed, depending on the material.

The components are preferably welded or adhesively bonded to one another. Welding takes place in particular by the CMT process, laser hybrid welding or laser brazing.

The components are preferably connected to one another in an interlocking and/or frictional manner. Said interlocking and/or frictional connection can be connected to a material-to-material bonding connection, in particular adhesive bonding. This results in the advantages mentioned above. An interlocking and/or frictional connection cannot, however, absorb any torque and is preferably used for connecting the cross piece to the side part of the seat part since said cross piece is part of the height adjuster and/or interacts therewith.

According to a further or a preferred subject matter of the present invention, the connection between the side part and the cross piece takes part from one direction, preferably from the x direction, irrespective of the type of connection. The x direction is the direction close to the forward direction of travel.

According to a further or a preferred subject matter of the present invention, the components are connected to one another by an interlocking and/or frictional connection before an adhesive has fully hardened.

According to a further or a preferred subject matter of the invention, the connecting region of the components is converted from an adhesive bonding part into a welding part before the welding operation. This takes place in particular by removal of parts of the adhesive bonding surface, in particular in such a manner that the contour along which welding can take place is increased.

DRAWINGS

The invention is explained below with reference to an example for a front seat and FIGS. 1 to 12. Said explanations are merely by way of example and do not restrict the general inventive concept. Said explanations apply equally to all of the subject matter of the present invention.

FIG. 3 shows a further embodiment of the backrest frame.

FIG. 4 shows two views of the upper cross piece.

FIG. 5 shows two views of the lower cross piece.

FIG. 6 shows the upper cross piece in a manner suitable for an adhesive bonding connection.

FIG. 7 shows an adhesive bonding connection between the backrest side part and the lower cross piece.

FIG. 10 shows the upper cross piece which can be used as a welding part and as an adhesive bonding part.

FIG. 11 shows the lower cross piece which can be used as a welding part and as an adhesive bonding part.

FIG. 12 shows the connection of the cross piece to the seat side part.

DETAILED DESCRIPTION

Figure 1:
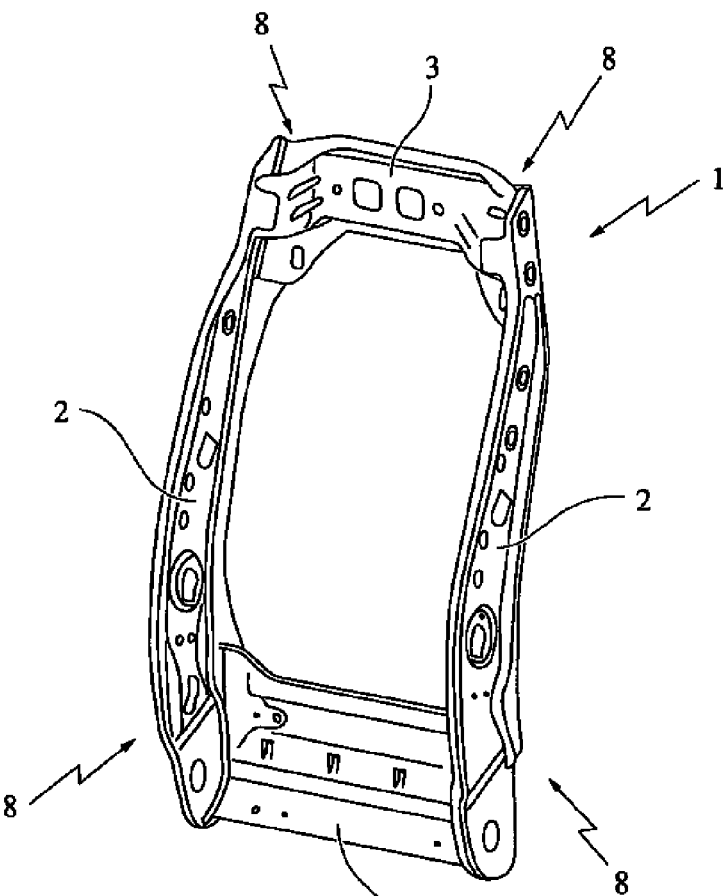
FIG. 1 shows a backrest frame.

The first exemplary embodiment (FIG. 1) shows a backrest frame 1 comprising two backrest side parts 2 made of high-strength steel, and an upper cross piece 3 and a lower cross piece 4, both produced from aluminum. The upper and lower cross pieces 3, 4 are connected by means of a cold metal transfer (CMT) welding process or other connecting techniques, such as adhesive bonding, to the galvanized (necessary for CMT) or plain high-strength backrest side parts 2. Said welding process permits the aluminum parts to be connected to the galvanized steel components. The intersections at which the cross pieces 3, 4 are connected to the backrest side parts 2 are designed in a modular manner in terms of structure in such a manner that they permit the optional fitting of aluminum cross pieces 3, 4, which customarily have a thicker sheet-metal thickness, or else of cross pieces 3, 4 composed of steel (smaller material thickness with identical design) without the backrest side parts 2 having to be adapted. This means that, with identical backrest side parts 2, two variants of a backrest frame 1 can be provided, to be precise the conventional steel/steel embodiment and the steel/aluminum hybrid construction. The method of connection can also be used equally for all of the configurations.

Figure 2:
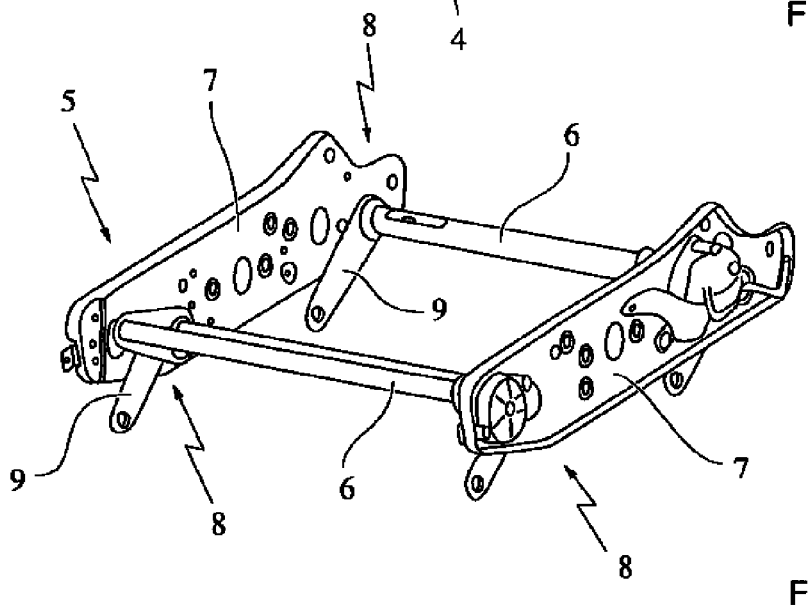
FIG. 2 shows the substructure of a motor vehicle seat.

There can be further possible uses in the substructure 5 (seat part with 2-, 4-, ≥6-directional adjustment) (FIG. 2). The aluminum transverse tubes 6 have a greater cross section than the steel transverse tubes 6 so as to behave in a similar manner in the event of a crash. The substructure side parts 7 are furthermore composed of steel or a lightweight construction material, for example, aluminum.

The transverse tubes are inserted into bores in the substructure side parts and secured there. In order to ensure that transverse tubes having different diameters can be used, the bore is dimensioned in accordance with the cross section of the largest transverse tube, the aluminum transverse tube. If steel tubes with a smaller cross section are used, the operation can then be carried out with adapter sleeves. The steel tube can also be widened in the connecting region. The rockers 9 are manufactured from light metal.

FIG. 3 shows a further embodiment of the backrest frame 1. In the present case the upper cross piece 3 and the lower cross piece 4 are connected to each other by welding, in particular CMT welding. In this case, as indicated by the arrow, the upper and lower cross pieces are inserted in the x direction into the side part and are welded there preferably by means of three weld seams in each case. Said procedure is also undertaken during the adhesive bonding or any other means of connecting the side part to the cross pieces. This avoids the considerably increased outlay on having to move the backrest frame during the machining.

FIGS. 4 and 5 each show two views of the upper cross piece 3 and the lower cross piece 4, respectively. It can clearly be seen that both the upper cross piece 3, in its connecting region 3', and the lower cross piece 4, in its connecting region 4', have contours 12 along which the welding takes place. Said contours 12 are produced in particular by punching them out. Said punching-out operation increases the length of the contour and therefore the length of the weld seam which is placed along the contour 12, which increases the stability of the connection to the side rest.

FIG. 6 shows the upper cross piece 3 which is designed in this case in such a manner that it can be adhesively bonded to the backrest side part 2 in the connecting region 8. For this purpose, the cross piece 3 preferably has three adhesive bonding surfaces, with the lower adhesive bonding surface particularly preferably being arranged at a right angle to the two upper adhesive bonding surfaces such that the component is completely fixed to the backrest side part in all directions. Said adhesive bond is preferably particularly preferably combined by means of a Tox clinching connection (not shown), i.e. a connection which is obtained by press-joining. Said interlocking and/or frictional connection serves in particular to fix the parts until the adhesive bonding connection has completely cured. However, even thereafter, said interlocking and/or frictional connection increase/increases the load-bearing capacity of the backrest frame.

FIG. 7 shows the lower cross piece 4 which is adhesively bonded onto the backrest side part by means of the adhesive bonding connecting points 11. Said connection is also supplemented by a Tox clinching connection (not illustrated). The connecting region 2' of the side part 2, i.e. the region against which the cross piece 4 bears against the side part 2, is dimensioned for an adhesive bonding connecting. Since the connecting surface required for an adhesive bonding connection is generally larger than for a welding connection, said region 2' is equally suitable, however, for a welding connection. The same is equally true of the connecting region 2' in which the upper cross piece is arranged on the side part 2.

Figure 8:
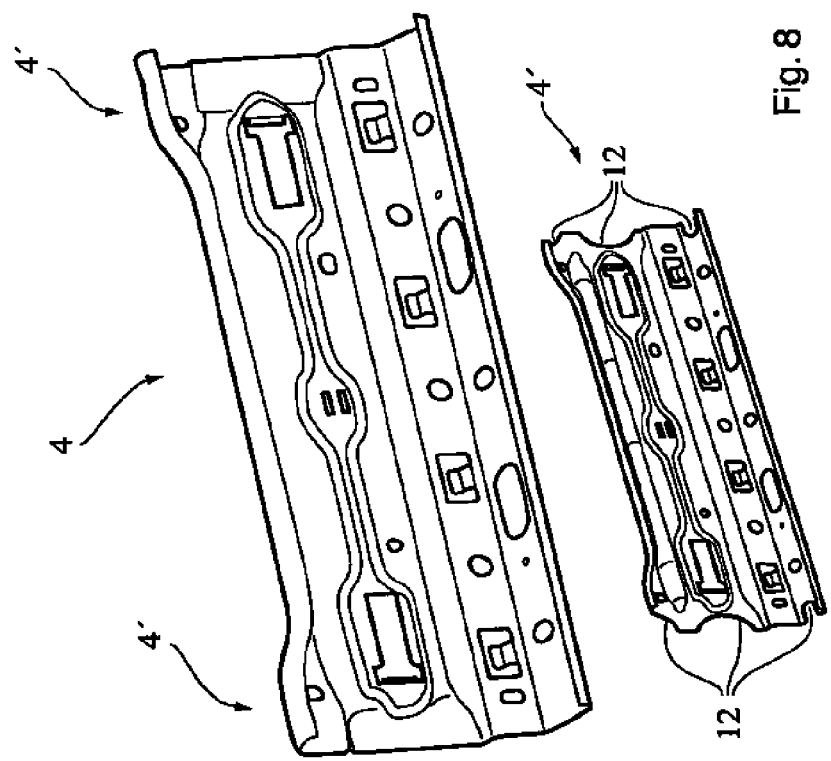
FIG. 8 shows the lower cross piece as an adhesive bonding part and as a welding part.

FIG. 8 shows the lower cross piece 4. The upper illustration shows the cross piece which is suitable in particular for an adhesive bonding connection. The lower illustration shows the cross piece which is suitable in particular for a welding connection. The two cross pieces differ merely by means of the welding contour 12. Initially, all of the parts are produced in a manner suitable for an adhesive bonding connection. If a cross piece is then to be welded onto the backrest side part, parts are subsequently punched or machined out of the edge region of the cross piece in such a manner that the welding contour 12 is produced.

Figure 9:
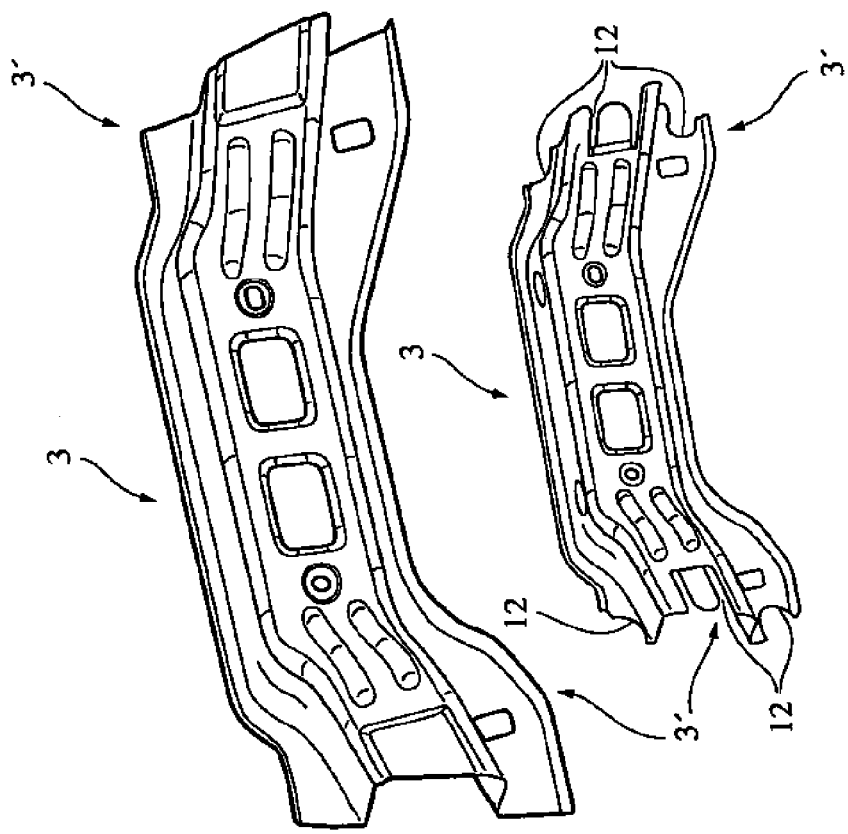
FIG. 9 shows the upper cross piece as an adhesive bonding part and as a welding part.

FIG. 9 shows the same relationship as FIG. 8, but for the upper cross piece 3.

FIGS. 10 and 11 show the upper and lower cross pieces which are suitable for a welding connection. In this case, the cross pieces 3, 4 are designed in such a manner that they can be connected without change to the side part 2 irrespective of whether the connection takes place by means of welding or by means of adhesive bonding. A comparison with the cross pieces 3, 4 in FIGS. 8 and 9 clearly shows that the regions which have been removed from the edge region are smaller than in the case of a cross piece which is suitable only for welding (cf. the lower illustration in FIGS. 8 and 9). As a result, the surface available for the adhesive bonding remains comparatively large. The welding contour 12 provided for the welding is not as long as for the welding cross piece according to FIGS. 8, 9 (lower illustration), but is longer than for a rectilinear contour.

FIG. 12 schematically shows the connection between a transverse tube 6 and the substructure side part 7. First of all, a component 13, which is part of a height adjuster (not illustrated) and/or is connected to a height adjuster, is guided over the transverse tube 6 (FIG. 12a) and is then connected to the tube by crimping. Since the part 13 has interlocking means 14 on its inner side, this results in an axially fixed connection with which torque can also be transmitted. The tube is then connected to the seat side part 7 by conical widening of the edge region of the tube 6. Said connection is designed in such a manner that the tube 6 can rotate in the side part 7.

The invention claimed is:

1. A structural element of a motor vehicle seat comprising:
a plurality of components, wherein at least some of the plurality of components are interconnected, wherein the plurality of components comprises:
a first component selectively formed from a lightweight construction or steel; and
a second component having a connecting region configured to couple to the first component, wherein the first component is formed with a first plurality of contours for coupling via an adhesive connection to the second component, the first plurality of contours is formable into a second plurality of welding contours for coupling via a welded connection to the second component, the connecting region has an edge region, the first component couples to the connecting region of the second component that remains substantially unchanged irrespective of whether the first component is formed from the lightweight construction or steel, the connecting region is configured to couple to the first component via an adhesive connection extending along a first plurality of contours of the first component, and the connecting region is configured to couple to the first component by a welded connection along a second plurality of contours formed on the first component to strengthen the welded connection, the second plurality of contours includes more contours than the first plurality of contours, and the connecting region remains substantially unchanged irrespective of whether the first component is bonded to the connecting region by the adhesive connection or the welded connection, and the first plurality of contours is formable into the second plurality of contours by machining or punching out at least a portion of the edge region.

2. The structural element as claimed in claim 1, wherein the second component comprises a backrest frame which has backrest side parts which are connected to each other by the first component.

3. The structural element as claimed in claim 2, wherein each side part is connected to the first component using the adhesive connection and an interlocking or frictional connection.

4. The structural element as claimed in claim 3, wherein each side part is coupled to the first component by press-joining.

5. The structural element as claimed in claim 1, wherein the second component comprises two substructure side parts connected to each other by at least the first component.

6. The structural element as claimed in claim 1, wherein a cross section of the first component is larger when the first component is formed from the lightweight construction than a cross section of the first component when the first component is formed from steel.

7. The structural element as claimed in claim 1, wherein the lightweight construction comprises aluminum or plastic.

8. The structural element as claimed in claim 1, wherein the lightweight construction comprises aluminum, plastic or a combination thereof.

9. A method for producing a motor vehicle seat comprising coupling a first component to a second component in a connecting region of the second component, wherein the first component is selectively formed from a lightweight construction or steel, and the second component couples to the first component in the connecting region that remains substantially unchanged irrespective of whether the first component is formed from the lightweight construction or steel, the first component is formed with a first plurality of contours for coupling via an adhesive connection to the second component, the first plurality of contours is formable into a second plurality of contours for coupling via a welded connection to the second component, the second component has an edge region, the second plurality of contours includes more contours than the first plurality of contours, a connecting region of the first component remains substantially unchanged irrespective of whether the first component is bonded to the connecting region by the adhesive connection or the welded connection other than the edge portion, and the first plurality of contours is formable into the second plurality of contours by machining or punching out at least a portion of the edge region.

10. The method as claimed in claim 9, wherein the first component is coupled to the second component using an interlocking or frictional connection.

11. The method as claimed in claim 9, wherein the first component is coupled to the second component unidirectionally.

12. The method as claimed in claim 9, wherein the first component is coupled to the second component by an interlocking or frictional connection before the adhesive connection has hardened.

13. The method as claimed in claim 9, wherein the first component is coupled to the second component using the adhesive connection followed by welding that establishes the welded connection.

14. The method as claimed in claim 9, comprising forming the second plurality of contours by punching or machining out excess material from the first component.

15. A structural element of a motor vehicle seat comprising:
a plurality of components, wherein at least some of the plurality of components are interconnected, wherein the plurality of components comprises:
a first component selectively formed from a lightweight construction or steel; and
a second component having an edge region of a connecting region configured to couple to the first component, wherein the first component couples to the connecting region of the second component that remains substantially unchanged irrespective of whether the first component is formed from the lightweight construction or steel, the first component is formed with a first plurality of contours for coupling via an adhesive connection to the second component, and the first plurality of contours is formable into a second plurality of welding contours for coupling via a welded connection to the second component, and the second plurality of contours includes more contours than the first plurality of contours, and the connecting region remains substantially unchanged irrespective of whether the first component is bonded to the connecting region by the adhesive connection or the welded connection, and wherein the first component is configured to couple to the second component using press joining, and the first plurality of contours is formable into the second plurality of contours by machining or punching out at least a portion of the edge region.

* * * * *